United States Patent [19]

Busso

[11] 3,926,070
[45] Dec. 16, 1975

[54] RACK-AND-PINION STEERING GEAR BOX INCORPORATING A DAMPER FOR MOTOR VEHICLES

[75] Inventor: Giuseppe Busso, Milan, Italy

[73] Assignee: Alfa Romeo S.p.A., Milan, Italy

[22] Filed: Sept. 7, 1973

[21] Appl. No.: 395,342

[30] Foreign Application Priority Data

Sept. 8, 1972   Italy .................................. 28977/72

[52] U.S. Cl. ...................... 74/498; 74/422; 280/90; 280/96
[51] Int. Cl. ............................................ B62D 3/12
[58] Field of Search ........... 74/422, 498; 280/90, 96

[56] References Cited

UNITED STATES PATENTS 3,593,592   7/1971   Adams ................................. 74/498
3,627,346   12/1971   Dorner et al. ......................... 280/96

Primary Examiner—Allan D. Hermann
Attorney, Agent, or Firm—Waters, Schwartz & Nissen

[57] ABSTRACT

A steering gear box for motor vehicles is disclosed, of the rack-and-pinion type, in which the rack rod is utilized for providing a cylinder for a damper, a tubular form being imparted to the rack at least in the portion which is intended for use as a damper cylinder. A considerable space saving is thus achieved.

6 Claims, 2 Drawing Figures

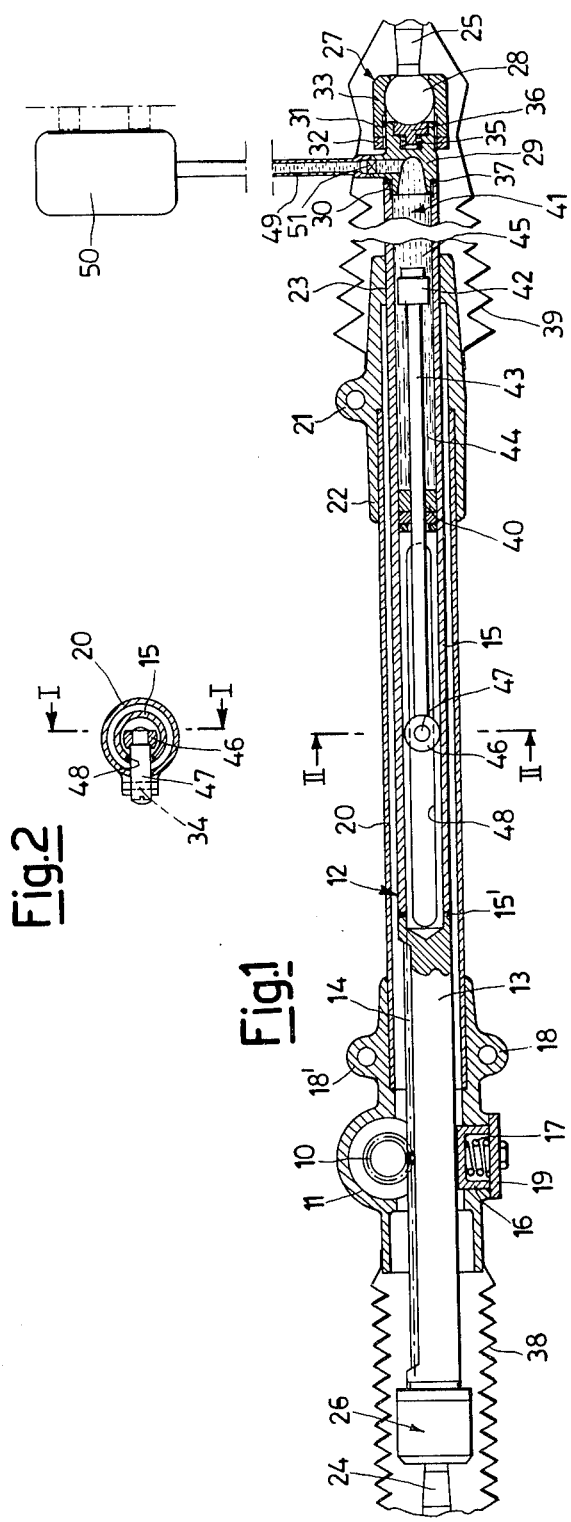

RACK-AND-PINION STEERING GEAR BOX INCORPORATING A DAMPER FOR MOTOR VEHICLES

This invention relates to a rack-and-pinion steering gear box in which a toothed rack incorporates a hydraulic damper.

The steering mechanisms with a rack-and-pinion control have a high efficiency and consequently a satisfactory reversibility; for this reason they are more sensitive than other mechanisms to possible transversal bumps on the wheels, due to the presence of obstacles or discontinuities of the ground and so forth.

Sometimes the bumps are transferred to the steering column and the steering wheel and originate unpleasant kicks and, in addition, they cause the car abruptly to steer if the driver does not react promptly.

For these reasons, a damper is often mounted in parallel with the rack for dampening the bump on the steering wheel, without having any influence on the reversibility of the drive.

It may happen, however, that, due to space shortage, the damper cannot be positioned in the conventional way.

An object of the invention is to provide a damper which does not require any supplementary space for being installed; as a matter of fact the rack rod itself is utilized as the cylinder of the damper and has a tubular shape imparted thereto at least in the shank which is utilized as a damper cylinder.

What has been said above can be better understood by scrutinizing FIGS. 1 and 2, which show, by way of example and without limitation, a preferred, exemplary embodiment of the invention. In the drawing FIG. 1 shows in an axial cross-sectional view a rack incorporating a damper according to the invention, the section being taken along the line I—I of FIG. 2;

FIG. 2 is a sectional view taken along the line II—II of FIG. 1.

In FIG. 1, there is indicated at 10 a steering pinion of a motor vehicle; the pinion 10 is supported for rotation by a box 11 and is mechanically connected to the steering wheel (not shown). At 12 a rack is generally indicated and comprises a solid portion 13 through which a crenellation 14 is cut, and a tubular portion 15 welded to the former at 15'; the rack 12 is supported in the box 11 by a pad 16; a spring 17 is inserted between the pad 16 and a lid 19.

At 20 there is shown an outer casing which connects the box 11 to the supporting member 22, the latter guiding the rack at 23. The assembly is affixed to the vehicle frame (not shown) by means of ears 18, 18' and 21.

To the ends of the rack 12 there are affixed, by spherical joints shown at 26 and 27, clevis 24 and 25; there have not been shown the lever arms of the steering knuckles of the wheels which are generally connected to the clevis 24 and 25 by means of spherical joints.

There is indicated at 29 a connection member of a link 27 which is screwed at 30 to the end of the tubular portion 15 of the rack and to which there are screwed at 31 a stop nut 32 and a body 33 of the spherical joint. The body 33 acts as a supporting member for a spherical pin 28 formed integrally with the clevis 25. Between the member 29 and the spherical pin 28 there are inserted a bearing 36 and a spring 35 for taking up the backlash of the linkage 27. There have been indicated at 38 a rubber bellows slipped onto the clevis 24 and the box 11, and at 39 a second bellows slipped onto the clevis 25 and the member 22.

The member 29 laterally closes the tubular portion 15 of the rack 12 (a gasket shown at 37 ensures a tight seal) and defines together with sealing members 40 a working chamber 41 of the damper. In the interior of the chamber is arranged the piston 42 which splits the chamber 41 into two half chambers 44 and 45 whose volumes are variable. The piston 42 is integral with a stem 43, the latter emerging from the chamber 41 through the sealing members 40.

In correspondence with foot 46 of stem 43 there is screwed a pin 47 which is passed through slot 48 formed through the portion of the tubular shank of the rack outside the chamber 41. As can clearly be seen in FIG. 2, the pin 47 is fastened to the casing 20 by a dowel 34.

The piston 42 does not provide an absolute seal between the two half chambers 44 and 45, as would be usual in shock absorbing devices; it permits a certain oozing, for example by means or a mere radial clearance on the piston in its cylinder, or by means of ducts which connect the opposite surfaces of the piston and are appropriately calibrated or cut off by automatic valves. These constructional details can only be shown in the drawings by an exaggeratedly enlarged radial clearance of the piston in its cylinder. Such expedients are commonly adopted in conventional hydraulic shock absorbers.

In the exemplary embodiment described herein there is a damper whose piston is stationary and the cylinder is movable; at every rack movement there is a flow of liquid from the chamber 44 to the chamber 45, and vice versa, and there is also a variation of the volume available for the fluid according to whether the stem enters the chamber 44 or emerges therefrom. Due to such a variation a compensation chamber is required to adjust the inflow or the outlet of the liquid to and from the working chamber.

In FIG. 1, such a compensation chamber, shown at 50, is affixed to the motor vehicle frame and is connected by a flexible tubing 49 to the chamber 41. The chamber 50 can also be made integral with the rack 12. If, then, the length of the rack 12 allows for it, the compensation chamber can be formed in the interior of the same rack, in series with the chamber 41; as an alternative, it can be affixed to the casing 20 in correspondence with the pin 47 and be connected to the chamber 41 by a duct formed through the piston 42, the stem 43 and the pin 47 itself.

As is known, the flow of liquid through the tube 49 is controlled by a conventional pressure valve as schematically shown at 51, which opens as the pressure in the half chamber 45 exceeds a preselected value. Such a pressure valve can be in the form of a double non-return valve which opens in one direction under a predetermined pressure difference of one sign, and opens in the opposite direction under another predetermined difference having the opposite sign. In the drawing, the schematically shown valve 51 opens upward (i.e. it allows the liquid to pass from chamber portion 45 to the compensation chamber 50) when the pressure in the chamber portion 45 exceeds a preselected value, and opens downward (i.e. it allows the liquid to return from the chamber 50 to the half chamber 45) when the pressure in the chamber portion 45 is below a further preselected value.

What is claimed is:

1. A rack-and-pinion steering-gear box for motor vehicles wherein a straight toothed rod is controlled to slide within a fixed tubular body by the rotation of a pinion, comprising aa two-membered hydraulic damper located inside an axially directed cavity of a hollow portion of said rod, said damper having a piston and a cylinder, which are respectively movable with a rectilinear motion along the axis of movement of said rod, the members of said damper being contained in the interior of said fixed body, one member being fastened to said body and the other to said rod.

2. The steering-gear box as defined in claim 1, wherein said piston is supported substantially at the end of a stem affixed to one of its faces, and the space comprised within said cylinder, in correspondence with one face of said piston, is connected to a compensation chamber through a valve which permits to discharge from said cylinder the liquid contained therein as the liquid pressure exceeds a preselected value.

3. The steering-gear box as defined in claim 1, wherein said one damper member is constituted by said piston while said other member is integral with said rod and is constituted by said cylinder.

4. The steering-gear box as defined in claim 3, wherein said cylinder is defined by said hollow portion of the rod.

5. A rack-and-pinion steering-gear box for motor vehicles wherein a straight toothed rod is controlled to slide within a fixed tubular body by the rotation of a pinion, comprising a two-membered hydraulic damper having a piston and a cylinder, which are respectively movable with a rectilinear motion along the axis of movement of said rod, the members of said damper being contained in the interior of said fixed body, one member being fastened to said body and the other to said rod, wherein the latter is at least partially hollow so as to provide therein said cylinder, and said piston is guided by a stem fastened to said fixed body.

6. The steering-gear box as defined in claim 5, wherein said rod has a first hollow portion forming said cylinder and a second hollow portion which freely houses said stem, the latter being fastened at one end to said piston and at the other end to a pin integral with a wall of said fixed body, and passed through a slot formed through a wall of said rod with an axis directed concordantly with its generating lines in correspondence with said second hollow portion.

* * * * *